3,332,994
ALKOXYCYANAMIDES AND THEIR
PREPARATION
Frank D. Marsh, Wilmington, Del., assignor to E. I. du
Pont de Nemours and Company, Wilmington, Del., a
corporation of Delaware
No Drawing. Filed June 17, 1966, Ser. No. 558,263
7 Claims. (Cl. 260—551)

This application is a continuation-in-part of my copending application Ser. No. 215,800, filed Aug. 9, 1962.

This invention relates to organic cyanamides and their preparation. More specifically, the invention relates to novel alkoxycyanamides and their preparation from alcohols and cyanogen azide.

The alkoxycyanamides of this invention can be represented by the structural formula

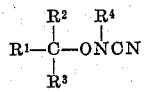

wherein $R^2$ and $R^3$ are each hydrogen, lower alkyl, or halo lower alkyl; $R^4$ is hydrogen or lower alkyl; $R^1$ separately is hydrogen, lower alkoxycarbonyl, alkyl or substituted alkyl in which the substituents or alkyl are the same and are halo, cyano, nitro, lower alkylcarbonyloxy, lower alkoxycarbonyl, or —ONHCN; and $R^1$ and $R^2$ joined together by a covalent bond form a divalent alkylene group of 3–7 carbon atoms which can contain substituents that are the same and are selected from halo, cyano, nitro, lower alkylcarbonyloxy, lower alkoxycarbonyl, or —ONHCN.

When $R^1$ is alkyl, the alkyl group is preferably of 1 to 25 carbon atoms; however, this limitation is not critical for, as shown below, $R^1$ can be a saturated hydrocarbon polymer chain.

The term "alkyl" used herein is defined in its usual meaning, i.e., it includes straight chains and branched chains. When the prefix "lower" is employed herein before the term "alkyl," it is defined as limiting the alkyl group to 1 through 6 carbon atoms. The term "halo" includes fluorine, chlorine, bromine or iodine.

The products of this invention are prepared by reacting cyanogen azide with an alcohol according to the equation $$N_3CN + ROH \rightarrow R\text{—}ONHCN + N_2$$

where R represents

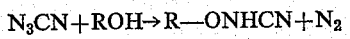

in which $R^5$ is defined the same as $R^1$ except that the —ONHCN substituents are replaced by OH substituents. For example, when $R^5$ is

then $R^1$ in the final product will be

Thus, the alcohol employed in the process of this invention is an aliphatic mono- or polyhydric alcohol.

The reaction is carried out over a temperature range of between about 25°–150° C., but preferably at about 45–75° C. Reaction times are not critical and will depend upon the temperature employed. In general, times of 4–24 hours are used in the preferred temperature range.

Pressure is not critical and be super- or sub-atmospheric. Batch reactions are most practically carried out at atmospheric pressure; however, batch, continuous flow, or vapor-phase procedures may be used at reduced or elevated temperatures.

When monohydric alcohols are employed in the reaction, the alcohol is used in a 1 to 100-fold molar excess. Cyanogen azide is extremely reactive and should be kept in an inert solvent, such as acetonitrile. This solution and the alcohol can then be mixed in the reaction vessel. If desired, the cyanogen azide can be prepared in situ. These preparations of cyanogen azide are described in U.S. patent application Ser. No. 215,800, filed Aug. 9, 1962.

When polyhydric alcohols are employed, a stoichiometric equivalent per hydroxyl group of cyanogen azide is used. The inert solvent can be used to control the reaction rate.

The products of this invention are normally isolated according to their thermal stability. For example, the tertiary alkoxycyanamides can ordinarily be distilled under reduced pressure; while primary and secondary alkoxycyanamides can be isolated by crystallization, chromatography, or solvent extraction. However, most of the products can be obtained in reasonably pure form by filtering the reaction mixture and evaporating excess solvent under reduced pressure.

The alkoxycyanamides of this invention can be converted to the corresponding substituted ureas, $$RONHCONH_2$$

by hydrolysis under acidic conditions, e.g., heating with an acid such as sulfuric acid.

The following examples serve to further illustrate the novel products and process of this invention, but are not intended to serve as limitations upon the foregoing discussion.

*Example 1*

Tert.-butoxycyanamide

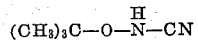

To a 500-ml. flask equipped with a magnetic stirrer, thermometer and condenser, the exit of which was attached through a —80° C. trap to a wet-test meter, was added cyanogen azide (0.06 mole, 4.1 g.) dissolved in acetonitrile (80 ml.). This solution was diluted with tert.-butyl alcohol (200 ml., 2.1 mole, 156 g.) and heated with stirring at 54–57° C. for 4 hrs., during which time nitrogen (0.05 mole) was liberated. Volatiles were removed from the reaction mixture on a rotary evaporator at 1 mm./25–35° C. to give a tan, mobile oil (4.53 g., 66%). This oil was distilled in a short-path still at 0.01µ pressure and a pot temperature of 43–52° C. to give pure t-butoxycyanamide (1.63 g., 24%). The H n.m.r. spectrum of a neat sample with tetramethylsilane (TMSi) as internal standard showed an unsplit peak at τ 1.88 (1H) assigned to the amino proton and a second unsplit peak at τ 8.77 (9H) assigned to the t-butyl group. Subsequent preparations by this procedure gave t-butoxycyanamide in a crude yield of 95–97% and distilled product ($n_d^{2.45}$ 1.4242) in 62–65% yield.

*Analysis.*—Calcd. for $C_5H_{10}N_2O$: C, 52.61; H, 8.83; N, 24.54; M.W., 114. Found: C, 52.24; H, 9.03; N, 24.55; C, 52.42; H, 8.91; N, 24.62. M.W., 113 (freezing point in benzene).

The infrared spectrum showed absorption at 3.17µ (NH), 3.35, 3.41, 3.50µ (saturated C—H), 4.49µ (CN), 7.19, 7.32µ (gem dimethyl), and 10.13µ (possibly C—ON).

The t-butoxycyanamide (5.90 g., 0.05 mole) was suspended in water (50 ml.) containing 10% sulfuric acid (2 ml.) and heated at 75–82° C. for ½ hr. The mixture was cooled, neutralized with ammonium hydroxide and then concentrated and filtered to give N-tert.-butoxyurea (5.12 g., yield 75.5%) as white needles. An analytical sample prepared by dissolving this product in hot alcohol, decolorizing with carbon black and crystallizing twice from alcohol and water, melted at 189.2–190.6°.

*Analysis.*—Calcd. for $C_5H_{12}N_2O_2$: C, 45.44; H, 9.15; N, 21.20; M.W., 132. Found: C, 45.64; H, 9.12; N, 20.93; C, 45.64; H, 9.18; N, 21.30. M.W., 124, 130 (cryoscopic in dimethyl sulfoxide).

$\lambda_{max}$ 2.91, 3.17μ (NH), 3.36, 3.41, 3.47μ (saturated C—H), 6.02μ (>C=O), 6.27, 6.44, 6.75 (NH and/or $NH_2$), 7.18, 7.32μ (gem dimethyl), 10.08μ (possibly NOC).

The H n.m.r. spectra in $(CD_3)_2SO$ with TMSi as internal standard showed three peaks at τ 8.80 (9H), 3.68 (2H) and 1.35 (1H).

Example 2

Isopropoxycyanamide

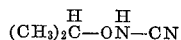
$(CH_3)_2C-O\overset{H}{N}-CN$

Cyanogen azide (0.28 mole, ca. 19 g.), dissolved in acetonitrile (50 ml.), was diluted with dry isopropyl alcohol (837 ml., ca. 11 moles or 60 g.) and heated with stirring at 55–58° C. for 3½ hrs., during which time nitrogen (~0.28 mole) was liberated. Volatiles were removed from ½ of the reaction mixture on a rotary evaporator at 1 mm./35° C. to give a mixture of isopropoxycyanamide and cyanamide (12.25 g., 87.5%, calcd. as isopropoxycyanamide). In a second preparation, a sample (18.01 g.) of this crude product was dissolved in ether (400 ml.) and extracted four times with a total of 200 ml. of water to remove cyanamide. The ether extract was dried over magnesium sulfate, filtered and the filtrate evaporated to dryness to give a tan oil (8.70 g.). This oil was distilled in a short-path still with a pot temperature of 25–52° C./0.15μ pressure to give a colorless oil (7.39 g.) which was not analytically pure but was identified as isopropoxycyanamide.

*Analysis.*—Calcd. for $C_4H_8N_2O$: C, 47.98; H, 8.05; N, 27.98; M.W., 100. Found: C, 46.92; H, 7.89; N, 29.97; M.W., 101 and 107 (cryoscopic in benzene).

The infrared spectrum showed absorption at 3.16μ (NH), 3.34, 3.40, 3.50μ (saturated C—H), 4.47 (CN), 7.22, 7.25μ (gem dimethyl), and 10.05μ (possibly NOC). The H n.m.r. spectrum of a neat sample with TMSi as internal standard showed a single peak at τ 1.70 (1H), attributed to the proton on nitrogen. A well-defined septet centered at τ 5.90 (1H) (J=6 c.p.s.) was assigned to the tert.-hydrogen and a doublet at τ 8.73 (J=6 c.p.s., 6H) was assigned to the methyl protons. Isopropoxycyanamide showed some tendency to decompose exothermically when allowed to stand at room temperature.

The isopropoxycyanamide (4.98 g., 0.05 mole) was added to water (50 ml.) at 90° C., acidified with 10% sulfuric acid (2 ml.), and heated at 80–90° C. for one hour. The reaction mixture was cooled to room temperature, neutralized with ammonium hydroxide and evaporated to dryness on a rotary evaporator to give a white crystalline solid (5.96 g., 100%). This solid was dissolved in ethyl acetate and filtered to remove a trace of ammonium sulfate. The filtrate was concentrated and cooled to give white needles (4.68 g., M.P. 113–117° C.) of isopropoxyurea. An analytical sample was dissolved in methylene chloride, passed through a shallow bed of alumina (Grade 1) and the eluant evaporated to dryness and recrystallized from ethyl acetate to give pure isopropoxyurea (M.P. 126.4–128.4° C.).

*Analysis.*—Calcd. for $C_4H_{10}N_2O_2$: C, 40.67; H, 8.53; N, 23.71; M.W., 118. Found: C, 40.69; H, 8.82; N, 24.06; M.W., 114 (cryoscopic in dimethyl sulfoxide).

The infrared spectrum of the compound was consistent with the proposed structure and showed absorption at 2.93, 3.17μ (NH and/or $NH_2$), 3.37, 3.43, 3.48μ (saturated C—H), 6.02μ (>C=O), 6.25, 6.44μ (NH and/or $NH_2$), 7.21, 7.27μ (gem dimethyl), and 10.05μ (possibly CON). The H n.m.r. spectrum in deuteroacetone with TMSi as internal standard gave a doublet at τ 8.80 (J=6 c.p.s., 6H) for the six methyl protons, a septuplet centered at τ 6.00 (J=6 c.p.s., 1H) assigned to the tertiary proton, a single exchangeable peak at τ 3.75 (2H, $NH_2$) and a single peak at τ 1.23 (1H, NH).

Example 3

Methoxycyanamide

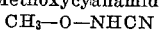
$CH_3-O-NHCN$

Cyanogen azide (0.25 mole, ca. 17 g.) in acetonitrile (50 ml.) was diluted with methanol (900 ml., ca. 22 moles or 700 g.) and heated at 56–60° C. for seven hours, during which time nitrogen (~0.23 mole) was liberated. One-half of the reaction mixture was evaporated to dryness on a rotary evaporator to give a mobile tan oil (9.96 g.). This product distilled with decomposition at a pressure of 0.2μ and a pot temperature of 36° C. to give a colored oil.

In a similar preparation from cyanogen azide (0.27 mole, ca. 18.4 g.) and methyl alcohol (900 ml.), a mobile oil (21.77 g.) was obtained. This oil was slurried with ether and filtered to remove an amorphous solid (6.36 g.) and gave, after removal of the ether, methoxycyanamide (15.36 g., 79%). The H n.m.r. spectrum of this oil in deuterochloroform showed a sharp single absorption at τ 6.12 (3H) and a broad peak at τ 2.50 (1H).

The methoxycyanamide (10.0 g., 0.14 mole) dissolved in ether (188 ml.) was added slowly to water (75 ml.) at 80° C. containing 10% sulfuric acid (3 cc.). The ether was distilled from the mixture and the water layer heated at 80–85° C. for one hour. The reaction mixture was cooled and filtered to remove a small amount of residue. The filtrate was neutralized with ammonium hydroxide and evaporated to dryness under reduced pressure to give methoxyurea (6.63 g., 52%) as a pale yellow crystalline solid. This solid was dissolved in acetonitrile and passed through a shallow bed of alumina (Grade 1). The eluant was evaporated to dryness, taken up in methylene chloride, decolorized with carbon black and crystallized by diluting with petroleum ether. The product was sublimed and recrystallized from methylene chloride to give pure methoxyurea as white needles melting at 85.3–86.7° C.

*Analysis.*—Calcd. for $C_2H_6N_2O_2$: C, 26.68; H, 6.68; N, 31.11; M.W., 90. Found: C, 26.95; H, 7.01; N, 30.83; C, 26.94; H, 6.66; N, 30.63. M.W., 90 (cryoscopic in dimethyl sulfoxide).

The infrared spectrum showed absorption at 2.96, 3.16μ (NH and/or $NH_2$), 3.38, 3.41μ (saturated C—H), 6.02μ (>C=O), 6.27μ ($NH_2$), and 10.33μ (possibly NOC). The H n.m.r. spectrum in $(CD_3)_2SO$ with tetramethylsilane as internal standard showed three single peaks at τ 6.47 (3H), 3.64 (2H) and 0.96 (1H).

Example 4

Tetramethylethylenebis(oxycyanamide)

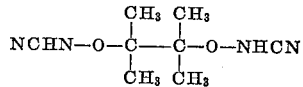

Pinacol (47.3 g., 0.4 mole) and a cyanogen azide 40.8 g., 0.6 mole) solution in acetonitrile (150 ml.) were stirred and heated at 45–53° C. for 41 hours., during which time nitrogen was liberated. The reaction was filtered to remove an amorphous solid and the filtrate diluted with diethyl ether and refiltered to remove additional solid. The filtrate was evaporated to dryness on a rotary evaporator (1 mm./35° C.) to give a brown oil (50.2 g.). This oil was diluted with diethyl ether, filtered and the ether removed on a rotary evaporator (1 mm./30° C.) to give a tan oil (27.4 g.) which crystallized on standing at room temperature to fine needles.

The infrared spectrum of the crystals showed absorption at 2.9μ (NH and/or OH), 3.39μ (saturated C—H), and 4.5, 4.65μ (CN).

The H n.m.r. spectrum determined in deuterchloroform showed an unsplit absorption at τ 8.75 (6H) and a broad absorption at τ 6.18 (1H).

Example 5

1-methylcyclopentoxycyanamide

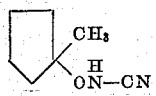

1-methylcyclopentanol (20 g., 0.2 mole) was added to cyanogen azide (0.14 mole, 9.5 g.) dissolved in acetonitrile (110 ml.). This solution was stirred and heated at 41–59° C. for 13 hrs., during which time nitrogen (ca. 0.18 mole) was liberated. The reaction mixture was filtered to separate a small amount of amorphous brown solid and the filtrate concentrated on a rotary evaporator at 1 mm./ 30° C. The resulting oil was dissolved in methylene chloride (200 ml.) and passed through a short bed of Florisil. The solvent was removed from the eluant on a rotary evaporator (2 mm./25° C.) to give a mobile oil (13.1 g.).

The infrared spectrum of this oil showed absorption at $3.0\mu$ (NH), 3.4, $3.5\mu$ (saturated CH), $4.5\mu$ (CN).

The H n.m.r. spectra of pure 1-methylcyclopentanol showed a single sharp absorption at τ 8.70 (3H, CH$_3$), a broad absorption centered at τ 8.38 (8H), assigned to the ring protons, and a single sharp peak at τ 6.94 (1H), assigned to the hydroxy proton. The H n.m.r. spectrum of the reaction product showed absorption at τ 8.70 and 8.38 identical to pure 1-methylcyclohexanol, but no sharp absorption occurred in the τ 6.94 region. Two new broad peaks appeared at τ 6.21 and τ 1.62 in a 3:1 ratio.

Cyclohexanol, when reacted with cyanogen azide in a similar fashion, gave a mobile unstable oil. The infrared and H n.m.r. spectrum of the crude product suggests it was predominantly cyclohexoxycyanamide.

Example 6

Hexafluoroisopropoxycyanamide

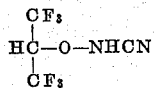

Hexafluoroisopropanol (150 ml.) and cyanogen azide (5.5 g., 0.08 mole) in acetonitrile (20 ml.) were stirred and heated at 50–62° C. for 7 hrs., during which time nitrogen (ca. 0.07 mole) was liberated. Excess hexafluoroisopropanol and acetonitrile were removed on a rotary evaporator at 25° C./0.5 mm. to give a brown oil (20.2 g.) which decomposed during distillation.

Example 7

Ethoxycyanamide
CH$_3$CH$_2$ONHCN

Absolute ethyl alcohol (1,500 ml.) was added to cyanogen azide (0.77 mole, 52.4 g.) in acetonitrile (175 ml.) and the solution stirred at 45–58° C. for 7 hrs., during which time nitrogen (ca. 0.75 mole) was liberated. The reaction mixture was filtered to remove a trace of solid. Volatiles were removed from an aliquot (500 ml.) on a rotary evaporator (1 mm./35° C.). There remained a mobile oil (21.4 g., 69%).

Infrared analysis of this oil showed strong absorption at $3.0$–$3.2\mu$ (NH) and $4.5\mu$ (CN).

The H n.m.r. spectrum, determined as a neat sample with TMSi as internal standard, showed a triplet at τ 8.72 (3H) for the methyl protons, a quadruplet at τ 6.09 (2H) for the methylene protons, and a broad absorption at τ 1.70 (1H) for the proton on nitrogen. The product, when distilled in a short-path still at 1–2μ, rearranged to a colorless oil containing some solid.

n-Butanol, when reacted with cyanogen azide in a similar fashion, gave a mobile oil whose infrared and H n.m.r. spectra indicated the product was predominantly n-butoxycyanamide.

Example 8

1-tetradecoxycyanamide
CH$_3$(CH$_2$)$_{12}$CH$_2$OHHCN

Cyanogen azide (10.2 g., 0.15 mole) in ethyl acetate (ca. 37 cc.) and 1-tetradecanol (32.15 g., 0.15 mole) were stirred and heated at 47–57° C. for 18 hrs., during which time nitrogen (ca. 0.15 mole) was liberated. The clear orange-colored solution was concentrated in a rotary evaporator at 1.5 mm./35° C. to give a mobile orange oil.

The infrared spectrum showed absorption at $3.0\mu$ (NH), 3.4, 3.49 (saturated CH) and $4.5\mu$ (CN).

The H n.m.r. spectrum of 1-tetradecanol in CCl$_4$ solution with TMSi as internal standard showed a single sharp absorption at τ 8.75 with smaller peaks of τ 8.48, 9.0, 9.12 [CH$_3$(CH$_2$)$_{12}$, 27H], a complex pattern at τ 6.55 (2H) assigned to the CH$_2$O protons and a broad absorption at τ 6.12 (1H) which exchanged with D$_2$O and was assigned to the hydroxyl proton.

The H n.m.r. spectrum of the crude reaction product of 1-tetradecanol and cyanogen azide was essentially identical with that of pure 1-tetradecanol, but no absorption for the hydroxyl proton (τ 6.12) was present. A new broad absorption at τ 5.85 which exchanged with D$_2$O was assigned to the amino proton.

Example 9

N-methyl-tert.-butoxycyanamide

Tertiary butoxycyanamide (11.4 g., 0.1 mole) dissolved in tetrahydrofuran (60 ml.) was added dropwise to a suspension of sodium hydride (2.6 g., 0.11 mole) in methyl iodide (28.2 g., 0.2 mole) and tetrahydrofuran (40 ml.) at 0–8° C. When hydrogen evolution ceased, the mixture was warmed slowly to room temperature and stirred for 24 hrs. The reaction mixture was poured into dry ether (400 ml.) and filtered to separate sodium iodide. The filtrate was evaporated to dryness at 0.2 mm./35° C. to give a mobile oil (12.50 g.) which was distilled in a molecular still at 0.2μ and a bath temperature of 20–25° C. to give pure N-methyl-tert.-butoxycyanamide (10.55 g., 83%).

*Analysis.*—Calcd. for CH$_{12}$N$_2$O: C, 56.22; H, 9.44; N, 21.86; M.W., 128. Found: C, 55.96; H, 9.49; N, 21.72; M.W., 128 (mass spectrometric).

The H n.m.r. spectra determined on a neat sample with tetramethylsilane as an internal standard showed two unsplit absorptions at τ 6.98 and 8.75 in a ratio of 1:3. The infrared spectrum showed absorptions at $3.37\mu$ (C—H), $4.52\mu$ (N—C≡N), and 7.18 and $7.31\mu$ (gem dimethyl groups).

The following table illustrates additional products of the invention and the corresponding alcohols used to prepare them by the general methods outlined in Examples 1–8.

| Alcohol | Product (R—O—N̅—CN)<br>R is |
|---|---|
| Pentanol-1 | C$_5$H$_{11}$— |
| Tert-butyl carbinol | H$_3$C—C(CH$_3$)(CH$_3$)—CH$_2$— |
| Octanol-1 | C$_8$H$_{17}$— |
| Dodecanol-1 | C$_{12}$H$_{25}$— |
| Hexadecanol-1 | C$_{16}$H$_{33}$— |
| Eicosyl alcohol | C$_{20}$H$_{41}$— |
| Ceryl alcohol | C$_{26}$H$_{53}$— |
| 2-fluoroethanol | FCH$_2$CH$_2$— |
| Ethylene chlorohydrin | ClCH$_2$CH$_2$— |

| Alcohol | Product (R—O—N(H)—CN) R is |
|---|---|
| 2,2,2-trichloroethanol | $Cl_3CCH_2-$ |
| 2-chloro-1-pentanol | $CH_3-(CH_2)_2-CHCl-CH_2-$ |
| Methyl glycolate | $CH_3-O-\overset{O}{\overset{\|}{C}}-CH_2-$ |
| Glycol monoacetate | $CH_3-\overset{O}{\overset{\|}{C}}-O-CH_2CH_2-$ |
| Hydracrylonitrile | $NC-CH_2CH_2-$ |
| 2-nitroethanol | $O_2NCH_2CH_2-$ |
| Sec.-butyl alcohol | $CH_3CH_2-\overset{CH_3}{\underset{\|}{C}H}-$ |
| Methyl tert.-butyl carbinol | $CH_3-\overset{CH_3}{\underset{\underset{CH_3}{\|}}{\overset{\|}{C}}}-\overset{CH_3}{\underset{\|}{C}H}-$ |
| Methyl lactate | $CH_3O-\overset{O}{\overset{\|}{C}}-\overset{CH_3}{\underset{\|}{C}H}-$ |
| 1-nitropropanol-2 | $O_2NCH_2-\overset{CH_3}{\underset{\|}{C}H}-$ |
| 2-hydroxy-3-chloropropionitrile | $NC-CH_2-\overset{CH_2Cl}{\underset{\|}{C}H}-$ |
| Dimethyl propyl carbinol | $C_3H_7-\overset{CH_3}{\underset{\underset{CH_3}{\|}}{\overset{\|}{C}}}-$ |
| 2-methylbutanol-2 | $C_2H_5-\overset{CH_3}{\underset{\underset{CH_3}{\|}}{\overset{\|}{C}}}-$ |
| 3-methylpentanol-3 | $C_2H_5-\overset{C_2H_5}{\underset{\underset{CH_3}{\|}}{\overset{\|}{C}}}-$ |
| Cyclobutanol | □ |
| Cyclooctanol | ⬡ |
| 2-chlorocyclopentanol | (cyclopentyl)-Cl |
| Ethylene glycol | $NCHNO-CH_2CH_2-$ |
| 1,3-butanediol | $NCHNO-CH_2CH_2\overset{CH_3}{\underset{\|}{C}H}-$ |
| Glycerine | $CH_2-CH-CH_2-$<br>$\|\quad\|$<br>$O\quad O$<br>$\|\quad\|$<br>$NHCN\ NHCN$ |
| 1,2,3,4-butanetetraol | $CH_2-CH-CH-CH_2-$<br>$\|\quad\|\quad\|\quad\|$<br>$O\quad O\quad O\quad O$<br>$\|\quad\|\quad\|\quad\|$<br>$NHCN\ NHCN\ NHCN\ NHCN$ |
| 1,6-hexanediol | $NCHNO-(CH_2)_6-$ |
| 1,8-octanediol | $NCHNO-(CH_2)_8-$ |
| Pentaerythritol | $NCHNOCH_2-\overset{CH_2ONHCN}{\underset{\underset{CH_2ONHCN}{\|}}{\overset{\|}{C}}}-CH_2-$ |
| Polyvinyl alcohol |  |
| 1,2-cyclohexanediol | (cyclohexyl with two —ONHCN groups) |

Representative N-(alkyl)alkoxycyanamides of the invention preparable by the method illustrated in Example 9 are listed as follows: N-(ethyl)cyclohexyloxycyanamide, N-(isopropyl)-n-decyloxycyanamide, N-(isobutyl)isopropoxycyanamide, N-(n-amyl)methoxycyanamide, and N-(3-methylpentyl)ethoxycyanamide.

A preferred class of compounds of the invention are those wherein $R^2$ and $R^3$ are each lower alkyl; $R_1$ separately is lower alkyl or lower alkyl substituted with —ONHCN and $R^1$ and $R^2$ taken together represent a divalent alkylene group of 3–5 carbon atoms; and $R^4$ is hydrogen.

The novel alkoxycyanamides are useful as intermediates to various compounds. As shown in some of the examples, they can be hydrolyzed to substituted ureas which find utility in applications common to urea compounds. The alkoxycyanamides can be alkylated with sodium hydride and a lower alkyl halide, e.g., $CH_3I$, to obtain N-(alkyl)alkoxy cyanamides of the formula RON-(alkyl)CN. The new N-(alkyl)alkoxycyanamides can also be hydrolyzed to corresponding substituted ureas in the same manner as the non-alkylated alkoxycyanamides.

The novel products of the invention can also be employed as water-proofing agents for cloth and paper; for example, a sample of cotton broadcloth was immersed in a 10% acetone solution of t-butoxycyanamide, air dried for 30 minutes, and then heated at 100°–120° C. for 1 hour. Water applied to fabric did not wet or penetrate it. Similarly, a piece of ordinary filter paper, when treated with the same solution and heated in a Carver press at 150°/7,000 p.s.i./15 sec., becomes water-proof.

Since it is obvious that many changes and modifications can be made in the above-described details without departing from the nature and spirit of the invention, it is to be understood that the invention is not to be limited to said details.

The embodiments of the invention in which an exclusive property or privilege is claimed are defined as follows:

1. An alkoxycyanamide of the structural formula $$R^1-\overset{R^2}{\underset{\underset{R^3}{\|}}{\overset{\|}{C}}}-ONCN\ \ R^4$$

wherein $R^2$ and $R^3$ are each selected from the group consisting of hydrogen, lower alkyl, or halo lower alkyl; $R^4$ is selected from the group consisting of hydrogen and lower alkyl; $R^1$ separately is selected from the group consisting of hydrogen, lower alkoxycarbonyl, alkyl of up of 25 carbon atoms and substituted alkyl of up to 25 carbon atoms in which the substituents on alkyl are the same and are selected from the group consisting of halo, cyano, nitro, lower alkylcarbonyloxy, lower alkoxycarbonyl, and —ONHCN; and $R^1$ and $R^2$ joined together represent a group selected from the class consisting of (a) divalent alkylene of 3–7 carbon atoms and (b) substituted divalent alkylene of 3–7 carbon atoms in which the substituents are the same and are selected from the group consisting of halo, cyano, nitro, lower alkylcarbonyloxy, lower alkoxycarbonyl and —ONHCN.

2. A compound of claim 1 wherein $R^2$ and $R^3$ separately are lower alkyl; $R^4$ is hydrogen; $R^1$ separately is lower alkyl or substituted lower alkyl in which the substituent is —ONHCN; and $R^1$ and $R^2$ together represent a divalent alkylene group of 3–5 carbon atoms.

3. A compound of claim 1 wherein $R^2$, $R^3$ and $R^4$ are each hydrogen and $R^1$ is lower alkyl.

4. A compound of claim 1 wherein $R^2$ and $R^3$ are each lower alkyl, $R^1$ is alkyl of up to 25 carbon atoms, and $R^4$ is hydrogen.

5. A compound of claim 1 wherein $R^1$, $R^2$ and $R^3$ are each methyl, and $R^4$ is hydrogen.

6. A compound of claim 1 wherein $R^2$ and $R^3$ are each methyl, $R^1$ is

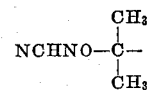

and $R^4$ is hydrogen.

7. A compound of claim 1 wherein $R^3$ is methyl, $R^1$ and $R^2$ are joined together to form a divalent alkylene group of 4 carbon atoms, and $R^4$ is hydrogen.

No references cited.

WALTER A. MODANCE, *Primary Examiner.*

HARRY I. MOATZ, *Assistant Examiner.*